United States Patent [19]
Baldwin

[11] 3,774,973
[45] Nov. 27, 1973

[54] VALVES FOR CONTROLLING FAULT INDICATORS IN VEHICULAR HYDRAULIC BRAKING SYSTEMS

[75] Inventor: Philip Sidney Baldwin, Florence, Italy

[73] Assignee: Fiat Societa per Azioni, Turin, Italy

[22] Filed: Apr. 10, 1972

[21] Appl. No.: 242,536

[30] Foreign Application Priority Data
Apr. 16, 1971  Italy .............................. 68266 A/71

[52] U.S. Cl. .................. 303/6 C, 200/82 D, 303/84
[51] Int. Cl. .............................................. B60t 8/26
[58] Field of Search .................... 303/6 C, 84, 84 A; 200/82 D

[56] References Cited
UNITED STATES PATENTS
3,448,230  6/1969  Bueler ............................ 303/6 C X
3,556,607  1/1971  Shutt et al. ........................... 303/6 C
3,586,384  6/1971  Falk ..................................... 303/6 C
3,667,810  6/1972  Silagy ................................. 303/6 C Primary Examiner—M. Henson Wood, Jr.
Assistant Examiner—Michael Mar
Attorney—Richard C. Sughrue et al.

[57] ABSTRACT

This invention relates to a valve for connection in hydraulic brake systems of the kind having front and rear brake circuits with a pressure reducer incorporated in the rear brake circuit. The valve has at least one member which is moved by the pressure in the rear brake circuit when there is a fault in the front brake circuit to establish direct communication with the rear brake circuit, by-passing the pressure reducer to maintain braking efficiency, while at the same time establishing an electrical circuit for a fault indicator such as a warning lamp.

16 Claims, 6 Drawing Figures

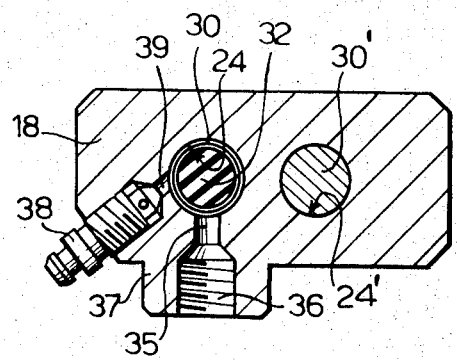
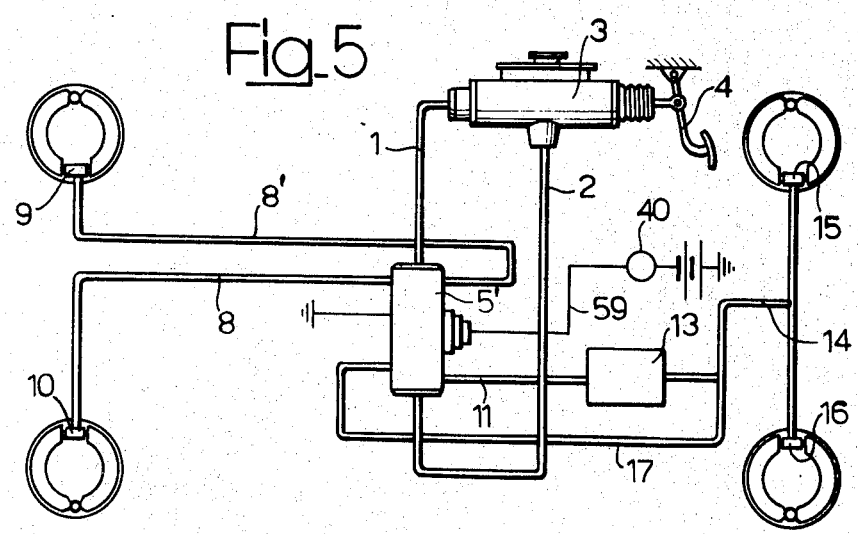
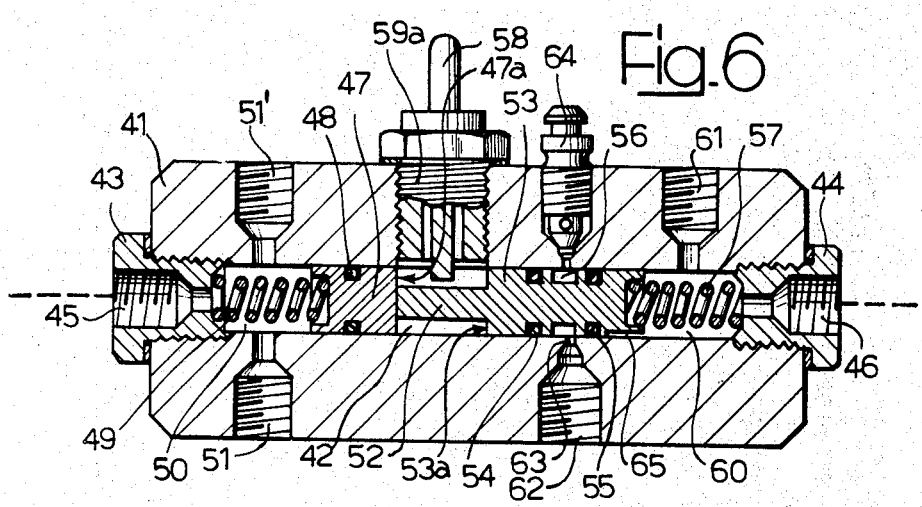

3,774,973

VALVES FOR CONTROLLING FAULT INDICATORS IN VEHICULAR HYDRAULIC BRAKING SYSTEMS

BACKGROUND OF THE INVENTION

This invention relates to valves for controlling fault indicators in vehicular hydraulic braking systems.

It is known to provide hydraulic braking systems for vehicles of the type having two separate circuits with arrangements for indicating damage due to loss of braking power in one or the other of the two circuits. Such arrangements comprise electrical circuits including, for example, warning lamps, and hydraulic valves cooperating with switches in the two circuits. The valves incorporate movable elements which occupy predetermined positions when the pressures in the two circuits are equal and which move to positions in which one or other of the electrical circuits is completed when the pressure in one of the brake circuits falls.

Hydraulic braking systems for vehicles are also known in which two separate hydraulic circuits are provided for the front and rear brakes, the circuit for the front brakes including a pressure reducer or so-called "braking corrector". It is also known to provide arrangements connected to the circuit of the front brakes and to the part of the rear brake circuit situated upstream of the pressure reducer for the purpose of by-passing or short-circuiting the pressure reducer in the event of damage or a fault causing loss of braking pressure in the front brake circuit.

In known systems in use at present, a warning indication of damage in one of the two brake circuits and short-circuiting of the pressure reducer in the event of damage in the front brake circuit can be effected only by providing the braking system with two separate arrangements, with in consequence increased structural complexity and cost of the overall system.

An object of the present invention is to provide an improved valve obviating the aforesaid disadvantages.

SUMMARY OF THE INVENTION

The present invention provides a valve for control of a damage or fault indicator in one of two brake circuits of an hydraulic braking system which is so arranged that the displacement of a movable member under the influence of hydraulic pressure in the rear brake circuit causes, in the event of damage or loss of braking pressure in the front brake circuit, direct communication of the valve with the rear brake circuit, by-passing the pressure reducer.

According to a preferred embodiment of the invention the valve has a body provided with first and second bores adapted to be connected with the front and rear brake circuits respectively, a first piston and a second piston each mounted for fluid-tight sliding movement in a respective cylindrical cavity in the body communicating with the first and second bores respectively and subjected, when the valve is installed, to the hydraulic pressures in the said bores, resilient means maintaining each piston spaced from an electrically insulated pin fixed in the body and connected in the circuit of an indicator device, the resilient means exerting on the respective pistons forces substantially matching the thrusts thereon in use of the valve due to the hydraulic pressure in the first and second bores respectively, the valve body having therein a passage adapted to be connected directly to the rear brake circuit and to the cavity which houses the first piston, the latter being so arranged as normally to isolate the said passage from the two bores and to connect the second bore to the said passage upon movement of said first piston against the action of the resilient means towards the said pin in the event of loss of braking pressure in the front brake circuit.

BRIEF DESCRIPTION OF THE DRAWINGS

The invention will be further described, by way of non-limiting example, with reference to the accompanying drawings, in which:

FIGS. 3 and 4 are sections along lines III—III and IV—IV respectively in FIG. 2;

FIG. 5 is a diagrammatic circuit of a braking system of the type having two brake circuits incorporating a valve according to a second embodiment of the invention, and FIG. 6 is a longitudinal section of the valve according to the second embodiment of the invention.

In all the figures corresponding component parts are denoted by the same reference numerals.

DETAILED DESCRIPTION OF THE ILLUSTRATED EMBODIMENTS

Figure 1:
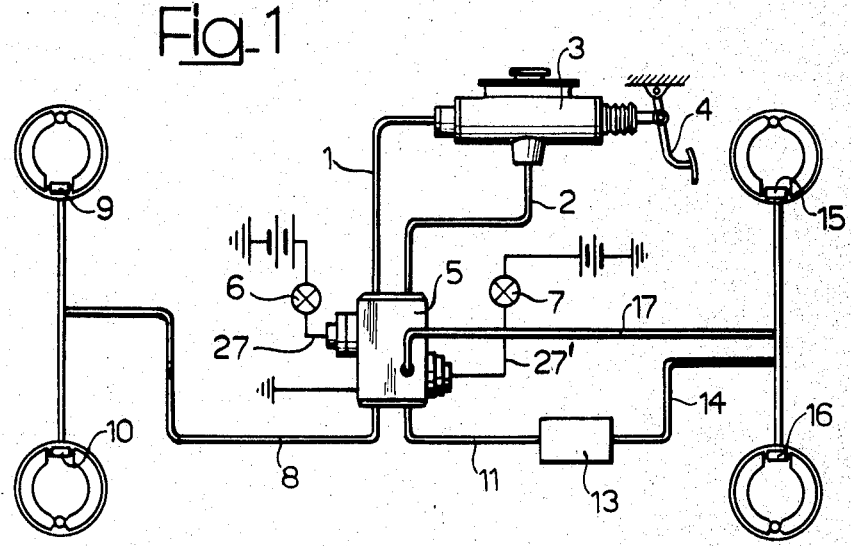
FIG. 1 is a diagrammatic circuit of an hydraulic braking system for a vehicle of the type having two separate brake circuits, incorporating a first embodiment of the valve according to the invention.

In the hydraulic braking system of FIG. 1 there are two pressure delivery pipes 1 and 2 respectively leading from a double master cylinder 3 controlled by pedal 4. The delivery pipes 1 and 2 form part of front and rear brake circuits respectively and are connected to a valve 5 according to the invention. The valve 5 controls indicator lamps 6, 7 which serve to indicate damage caused by loss of braking pressure in the front brake and rear brake circuits respectively.

The pipe 1 communicates through the valve 5 as described hereinafter with a pipe 8 connected to two front brake actuator cylinders 9 and 10. The pipe 2 communicates through the valve 5 with a pipe 11 connected by way of a pressure reducer 13 or so-called "braking corrector", to a pipe 14 which in turn is connected to two rear brake actuator cylinders 15 and 16. The valve 5 is also connected through a pipe 17 to a point in the rear brake circuit situated downstream of the pressure reducer 13.

Figure 2:
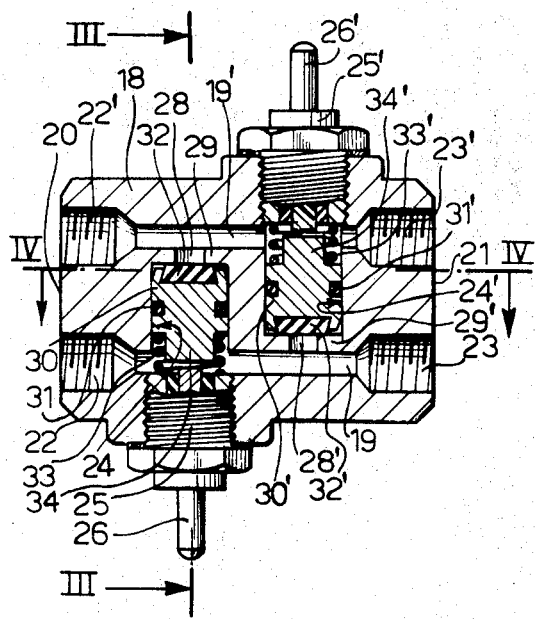
FIG. 2 is a longitudinal section of the valve employed in the circuit of FIG. 1.
Figure 3:
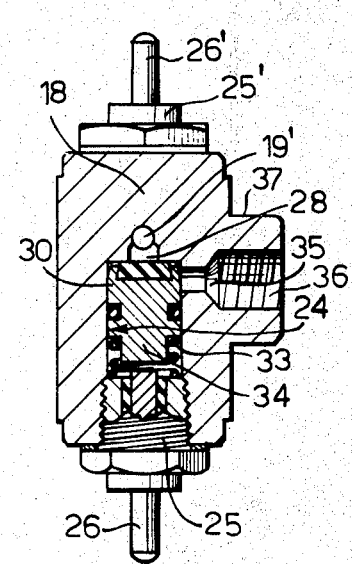

The valve 5, as shown in FIGS. 2 to 4, comprises a body 18 in which two identical parallel through bores 19, 19' are formed, each terminating at opposite faces 20 and 21 of the body 18 in internally screw-threaded sockets. In particular the bore 19 terminates at one face 20 in a screw-threaded socket 22 adapted to receive one end of the pipe 1, and terminates at the other face 21 in a screw-threaded socket 23 adapted to receive one end of the pipe 8. Similarly the bore 19' terminates at the face 20 of the valve body 18 in a threaded socket 22' adapted to receive one end of the pipe 2 and terminates at the face 21 in a threaded socket 23' adapted to receive one end of the pipe 11.

The bore 19 is intersected by a cylindrical cavity 24 the axis of which intersects at right angles the axis of the bore 19. The cavity 24 is closed at one end by a plug 25 in which a metal pin 26, insulated electrically from the plug, is secured and is adapted to be connected by means of a conductor 27 (FIG. 1) to a series circuit comprising the indicator lamp 6 and a battery power source. The cavity 24 communicates with the bore 19' at its other end through an aperture 28 cut in the end wall 29 of the cavity.

The bore 19' is intersected at right angles by a cylindrical cavity 24', identical to the cavity 24, which is closed at one end by a screw-threaded plug 25' carrying a metal pin 26' insulated from the plug and adapted to be connected to a conductor 27' (FIG. 1) forming part of the circuit of the indicator lamp 7. At its other end the cavity 24' communicates with the bore 19 through an aperture 28' in the end wall 29' of the cavity 24' itself.

In each of the cavities 24, 24' respective small identical pistons are mounted for sliding movement. Each of the pistons comprises a head 30 and 30' respectively mounted for sliding movement in the cavity 24, 24' with the interposition of fluidtight O-rings 31, 31' housed in respective circumferential annular channels cut in the wall of each piston head within the cavities 24, 24'.

The piston heads 30 and 30' each carry, in their end faces turned towards the respective end walls 29 and 29', respective disc-like washers 32, 32' made of elastic material, for example of rubber. Each of the washers 32, 32' is housed in a circular recessed seat with a frusto-conical wall and an enlarged base cut in the end face of the respective piston head 30, 30'.

The piston heads 30, 30' are formed adjacent the frusto-conical seats for the washers 32, 32' with respective frusto-conical external surfaces tapering towards the said ends of the piston heads in which the recessed seats are formed.

The piston heads 30, 30' are urged against the respective end walls 28, 28' of the cavities 24, 24' by respective small helical springs 33, 33' interposed between the heads themselves and the plugs 25, 25'. The springs 33, 33' surround respective bosses 34, 34' of the respective pistons, which extend towards the respective pins 26 and 26', the inner ends of which project from the inner faces of the plugs 25 and 25'. The length of each piston head 30, 30' is shorter than the length of the respective cavity 24, 24' comprised between the end wall 29, 29' and the intersected bore 19, 19', by an amount which is greater than the axial gap between the adjacent ends of the piston stem 34, 34' and the pin 26, 26' in the normal position of the piston.

The cavity 24 closed by the plug 25 is connected through a radial passage 35 with threaded socket 36 machined in a small lateral boss 37 formed integrally on the body 18 and adapted to receive one end of the pipe 17. The passage 35 communicates with the cavity 24 adjacent one end such that it is normally isolated both from the aperture 28 communicating with the bore 19' by virtue of the sealing of the washer 32 against the wall 29, and is isolated from the bore 19 due to the presence of the sealing O-ring 31 carried by the piston head 30, at a sufficient distance from the smaller diameter end of the head 30.

A small purging valve 38 (FIG. 4) communicates with the cavity 24 through a drilling 39 the axis of which lies in the same plane containing the axis of the passage 35.

The braking system according to FIG. 1 incorporating the valve shown in FIGS. 2 to 4 operates as follows.

When the system is in the inoperative (non-braking) position, the components of the valve 5 occupy the positions shown in FIGS. 2 to 4. During braking under conditions of perfect integrity of the two circuits, the various components of the valve 5 do not move from the positions which they occupy when the system is inoperative: equal pressures are transmitted through the bores 19 and 19' and the pipes 1 and 2, the two piston heads 30 and 30' resting against the end walls 29 and 29' respectively, that is, in positions in which the washers 32 and 32' respectively close the apertures 28 and 28'. Consequently the bosses 34 and 34' of the two pistons are kept spaced from the respective pins 26 and 26' and the circuits of the two indicator lamps 6 and 7 are both incomplete.

Since under these conditions of integrity communication between the bore 19' and the passage 35 is also interrupted the pipe 17 is cut off and pressure is applied to the rear brake cylinders 15 and 16 via the pipe 2 through the pressure reducer 13.

In the event of braking power loss in the hydraulic circuit of the rear brakes, manifested as a pressure drop at the socket 23', the hydraulic pressure in the bore 19 displaces the piston 30', 34' against the action of the spring 33' in direction of the plug 25'. As soon as the boss 34' engages the pin 26' the circuit of the lamp 7 is completed through the piston head 30' and the body 18 and the lamp 7 is lit, indicating inefficiency of the rear brakes.

When, on the other hand, the efficiency of the front braking circuit is impaired or compromised due to a fall in braking pressure, the pressure in the rear brake circuit transmitted to the bore 19' through the pipe 2 displaces the piston 30, 34 in direction of the plug 25, completing the circuit of the indicator lamp 7 as soon as the boss 34 engages the pin 26, the lamp 7 then being lit to indicate inefficiency of the front brakes. At the same time, the movement of the piston 30, 34 puts the bore 19' into communication with the passage 35, enabling a flow of brake fluid from the pipe 2 through the pipe 17 directly to the rear brake actuator cylinders 15 and 16, by-passing the pressure reducer 13.

The hydraulic braking system illustrated in FIG. 5 differs from that shown in FIG. 1 in having a different arrangement of the valve 5' which controls functioning of the visual fault or damage indicator. The indicator comprises in this case a single indicator lamp 40 which is arranged so as to be lit during braking in the event of loss of braking power in the circuits of the front or the rear brakes.

The valve 5' comprises (FIG. 6) a cylindrical body 41 traversed over its entire length by a through bore 42 having internally threaded ends into which are screwed respective apertured plugs 43 and 44 respectively. In the plug 43 is a threaded socket 45 formed for connection to the pipe 1; in the plug 44 a threaded socket 46 is formed for connection to the pipe 2. Adjacent the plug 43 in the bore 42 there is located a first slidable piston 47 carrying an O-ring 48 housed in a peripheral annular channel cut in the cylindrical surface of the piston itself.

The plug 43 is held spaced from the piston 47 by the action of a lightly precompressed helical spring 49 housed in a chamber 50 delimited within the bore 42 between the plug 43 and the piston 48. The chamber 50 communicates with the threaded socket 45 of the plug 43 and, through two radial drillings 51 and 51' arranged symmetrically on opposite sides of the bore 42 within the body 41, with the pipes 8 and 8' respectively which transmit hydraulic pressure to the front brake actuator cylinders 9 and 10. The spring 49 urges the piston 47 against a stem 52 of a second piston 53 which carries two identical O-rings 54, 55 housed respectively in annular circumferential channels spaced apart axially in the cylindrical surface of the piston 53. Between the channels housing the O-rings 54, 55 the piston 53 has an annular circumferential groove 56. Another helical spring 57, also lightly precompressed, is interposed between the piston 53 and the plug 44.

The forces exerted by the springs 49 and 57 is such as to maintain the end faces 47a and 53a of the two pistons 47 and 53 which respectively face towards each other equidistant from a pin 58 which projects into the bore 42 in a radial direction. The pin 58 is connected through the conductor 59 (FIG. 5) to the circuit of the indicator lamp 40. The pin 58 is supported by insulating material in a plug 59a screwed into a threaded radially extending cross bore which communicates with the bore 42.

A chamber 60 is delimited axially within the bore 42 between the piston 53 and the plug 44. The chamber 60 communicates with a radial drilling 61 in the body 41 and is adapted to be connected to the pipe 11; the chamber 60 further communicates, through the socket 46 of the plug 44, with the pipe 2.

An internally threaded radial passage 62 is drilled in the body 41 and is adapted to be connected to the pipe 17 which by-passes the pressure reducer 13. The passage 62 communicates through a small orifice 63 with the annular groove 56 of the piston 53, when the latter occupies the position shown in FIG. 6 in which the faces 47a and 53a of the pistons 47 and 53 respectively are equidistant from the pin 58. Under these conditions the annular groove 56 also communicates with a purging valve 64 screwed into a further threaded seat cut in the body 41.

When the system is inoperative, as shown in FIG. 5, and during braking under conditions of perfect integrity of the two braking circuits, the parts of the valve 5' occupy the positions shown in FIG. 6.

In the event of damage to or a fault in one of the two braking circuits during braking, there is drop in hydraulic pressure in one of the two chambers 50 or 60, and the two pistons 47 and 53 will both be displaced to the left or to the right of the position illustrated in FIG. 6, bringing one of the two faces 47a or 53a into contact with the pin 58 and thereby completing a circuit for the indicator lamp 40, which becomes lit.

When in particular the hydraulic pressure in the front brake circuit connected to the chamber 50 is lower than that in the chamber 60, displacement of the piston 53 into engagement with the pin 58 causes, in addition to the illumination of the single indicator lamp 40, also the placing of the passage 62 into communication, through the orifice 63, with the chamber 60 connected to the pipe 2, by way of a small notch 65 in the surface of the piston 53 adjacent the plug 44 and terminating at a short distance from the annular channel which houses the O-ring 55.

By putting the chamber 60 into communication with the orifice 63 free flow of the hydraulic fluid is permitted through the pipe 17, by-passing the pressure reducer 13, and effective braking of the vehicle is then possible using only the rear brakes, without having to exert excessive force on the pedal 4.

It will be appreciated that the details of practical embodiments may be widely varied from those which have been described and illustrated, purely by way of example, without thereby departing from the scope of this invention.

I claim:

1. In a vehicular hydraulic braking system of the kind having a master cylinder, separate front and rear brake circuits, a pressure reducer incorporated in the rear brake circuit, and at least one damage indicator for indicating inadequate braking pressure in said circuits, the improvement comprising a valve controlling said damage indicator and connected to the front and rear brake circuits, said valve including:

a body provided with first and second bores adapted to be connected to the front and rear brake circuits respectively, a first piston and a second piston each mounted for fluid-tight sliding movement in a respective cylindrical cavity in the body communicating with the first and second bores respectively, the pistons being subjected, when the valve is installed, to the hydraulic pressures in the respective bores, at least one insulated pin fixed in the body and connected in the circuit of said damage indicator, resilient means maintaining each piston spaced from the respective insulated pin, said resilient means exerting on the respective pistons forces substantially matching the thrusts thereon in use of the valve due to the hydraulic pressure in the first and second bores respectively, and means defining a passage in the valve body adapted to be connected directly to the rear brake circuit, said passage communicating with the cavity which houses the first piston, said first piston normally isolating said passage from the two bores and connecting said second bore to said passage upon movement of said first piston, against the action of said resilient means, towards said insulated pin in the event of loss of braking pressure in the front brake circuit.

2. Valve as claimed in claim 1, wherein said first and second bores in the valve body are parallel through-bores and are each provided at their ends with threaded sockets adapted to receive the ends of pipes connected respectively to the master cylinder, the front brake circuit and the pressure reducer of the brake system.

3. Valve as claimed in claim 2, wherein the first cavity housing the first piston intersects the first bore and has an end wall at one end provided with an aperture communicating with the second bore, a plug closing the other end of said first cavity, and wherein the second cavity housing the second piston intersects the second bore and has an end wall at one end provided with an aperture communicating with the first bore, a plug closing the other end of said second cavity.

4. Valve as claimed in claim 3, wherein the axes of said cylindrical cavities are parallel to one another and perpendicular to and coplanar with the axes of said two bores.

5. Valve as claimed in claim 3, wherein said cylindrical cavities and their respective plugs are of equal size.

6. Valve as claimed in claim 3 wherein two respective insulated pins are provided, extending axially through said plugs and projecting from surfaces of the latter which face said pistons in the respective cavities.

7. Valve as claimed in claim 1, wherein the resilient means which maintain the pistons spaced from said at least one insulated pin comprise helical springs acting on the pistons and located in the respective cavities.

8. Valve as claimed in claim 3, wherein each of the pistons has a head mounted in the part of the respective cavity disposed between the respective bore intersecting the cavity and the respective end wall of the cavity, and a stem which extends axially in the respective cavity and which in the normal position of the piston is spaced a short distance from the adjacent end of said insulated pin.

9. Valve as claimed in claim 8 wherein each piston head carries a disc-like sealing washer of elastic material in its end facing towards a respective apertured end wall of the respective cavity housing the piston.

10. Valve as claimed in claim 9, wherein the sealing washers are located in respective recessed seats in the respective piston heads, said seats having frusto-conical side walls with enlarged bases.

11. Valve as claimed in claim 10, wherein each piston head is formed, adjacent its frusto-conical recessed seat, with a frusto-conical external surface tapering towards the said recessed end of the piston head.

12. Valve as claimed in claim 8, wherein the difference between the length of each piston head and the length of the respective cavity in which the piston slides comprised between said apertured end wall of the cavity and said bore which it intersects, is greater than the axial separation between the adjacent ends of the piston stem and said insulated pin in the normal position of the piston.

13. Valve as claimed in claim 12, wherein each said piston head carries at least one annular sealing ring of elastic material making sealing contact with the cylindrical wall of the respective cavity and wherein said head has at least one circumferential annular channel in which said sealing ring is located, said channel being spaced from the respective end of the piston head which faces said end wall of the respective cavity.

14. Valve as claimed in claim 13, wherein the cavity in which the first piston slides communicates with the passage formed in the body and adapted to be connected directly to the rear brake actuators through an opening in part of the wall of the said cavity situated between the respective apertured end wall of the cavity and the zone in which said at least one annular sealing ring is carried by said piston head, when the latter is in a position in which the sealing washer carried thereby closes the aperture in said end wall of said cavity.

15. Valve as claimed in claim 1, wherein:
the two bores are interconnected through the cavities of the pistons, the said bores and the cavities being coaxial so as to form a single through-bore;
the pistons have at least one stem integral with at least one of the pistons, said pistons being spaced apart by said stem by equal distances from said insulated pin fixed to the valve body, said pin projecting laterally into said bore;
apertured plugs close the opposite ends of said bore, the apertures of said plugs being adapted to be connected to the master cylinder;
respective springs are interposed between the plugs and the pistons to maintain the latter spaced from the plugs and equidistant from the insulated pin, and
respective first and second chambers are formed between said plugs and said pistons and are adapted to be connected to the front brakes and to the pressure reducer respectively, said passage in the body adapted to be connected directly to the rear brakes communicating with said bore at a position which is isolated from the second chamber when the pistons are equidistant from said insulated pin and which is put into communication with said chamber when the pistons move in the direction of the first chamber in the event of pressure loss in the front brake circuit.

16. Valve as claimed in claim 15, including two circumferential channels in said second piston, respective sealing rings in said channels, and an annular groove in the circumference of the second piston, said passage communicating with said annular groove.

* * * * *